US009909042B2

(12) United States Patent
Berard et al.

(10) Patent No.: US 9,909,042 B2
(45) Date of Patent: Mar. 6, 2018

(54) TWO-PART FOAMABLE ADHESIVE WITH RENEWABLE CONTENT FOR FLEECE BACK MEMBRANES

(75) Inventors: Nicholas John Berard, Novi, MI (US); Wayne Mazorow, Orange Village, OH (US); Michael Lewis Kerman, Romeo, MI (US)

(73) Assignee: ADCO Products, LLC, Michigan Center, MI (US)

( * ) Notice: Subject to any disclaimer, the term of this patent is extended or adjusted under 35 U.S.C. 154(b) by 158 days.

(21) Appl. No.: 13/812,079

(22) PCT Filed: Jun. 13, 2011
(Under 37 CFR 1.47)

(86) PCT No.: PCT/US2011/040161
§ 371 (c)(1), (2), (4) Date: Apr. 30, 2013

(87) PCT Pub. No.: WO2012/015538
PCT Pub. Date: Feb. 2, 2012

(65) Prior Publication Data

US 2014/0356568 A1 Dec. 4, 2014

Related U.S. Application Data

(60) Provisional application No. 61/368,957, filed on Jul. 29, 2010.

(51) Int. Cl.

| | |
|---|---|
| ***C09J 175/04*** | (2006.01) |
| ***E04D 5/14*** | (2006.01) |
| ***C08G 18/36*** | (2006.01) |
| ***C08G 18/48*** | (2006.01) |
| ***C08G 18/77*** | (2006.01) |

(52) U.S. Cl.
CPC ............ *C09J 175/04* (2013.01); *C08G 18/36* (2013.01); *C08G 18/4825* (2013.01); *C08G 18/771* (2013.01); *E04D 5/148* (2013.01); *C08G 2170/60* (2013.01); *Y10T 428/23914* (2015.04)

(58) Field of Classification Search
CPC ...... C09J 175/04; E04D 5/148; C08G 18/771; C08G 18/36; C08G 2170/60; Y10T 428/23914
USPC ................ 52/408; 156/331.4, 331.7; 428/86; 521/170
See application file for complete search history.

(56) References Cited

U.S. PATENT DOCUMENTS 3,957,711 A * 5/1976 Powanda ............ D06M 15/267 524/458
4,996,812 A * 3/1991 Venable .................... E04D 5/12 428/148
5,470,622 A * 11/1995 Rinde ................ B29C 61/0616 156/84
5,872,203 A * 2/1999 Wen .................... C08G 18/698 428/423.1

(Continued)

*Primary Examiner* — Charles A Fox
*Assistant Examiner* — Joseph J. Sadlon
(74) *Attorney, Agent, or Firm* — Benesch, Freidlander, Coplan & Aronoff LLP

(57) ABSTRACT

An adhesive composition for use on a fleece-backed roofing substrate includes two components that are mixed prior to application on the fleece backed roofing substrate. The first component includes renewable polyol, catalyst, fumed silica, and surfactant. The renewable polyols are selected from any non-petroleum based polyol that is derived from a renewable source. The second component includes isocyanates, including renewable and non-renewable isocyanates.

6 Claims, 1 Drawing Sheet

10
20
22
24
18
16
12
14

(56) References Cited

U.S. PATENT DOCUMENTS

| | | | | |
|---|---|---|---|---|
| 5,968,995 | A * | 10/1999 | Rizk | C08G 18/10 521/159 |
| 5,976,292 | A * | 11/1999 | Barksdale | A47L 13/16 15/229.13 |
| 6,607,793 | B2 * | 8/2003 | Hubbard | E04D 5/12 428/141 |
| 6,742,313 | B2 | 6/2004 | Ritland et al. | |
| 6,938,386 | B2 | 9/2005 | Ritland et al. | |
| 7,069,698 | B2 * | 7/2006 | Nee | E04D 13/10 52/24 |
| 7,317,051 | B2 * | 1/2008 | Georgeau | B32B 11/02 524/59 |
| 7,595,094 | B2 * | 9/2009 | Kurth | C08G 18/10 427/389.9 |
| 7,622,187 | B2 * | 11/2009 | Clarke | E04D 5/148 428/304.4 |
| 7,767,308 | B2 * | 8/2010 | Georgeau | C08G 65/336 428/423.1 |
| 8,419,872 | B2 * | 4/2013 | Smith | C08G 18/10 106/273.1 |
| 8,791,167 | B2 * | 7/2014 | Bowman | C08J 9/142 252/67 |
| 9,045,581 | B2 * | 6/2015 | Geiger | C07D 303/42 |
| 2005/0070649 | A1 * | 3/2005 | Fisher | C08L 21/00 524/270 |
| 2005/0260351 | A1 * | 11/2005 | Kurth | C08G 18/10 427/372.2 |
| 2007/0264471 | A1 * | 11/2007 | Kalwara | B29C 65/5057 428/141 |
| 2009/0100775 | A1 * | 4/2009 | Trial | E04D 5/10 52/408 |
| 2010/0059098 | A1 | 3/2010 | Beernink et al. | |

* cited by examiner

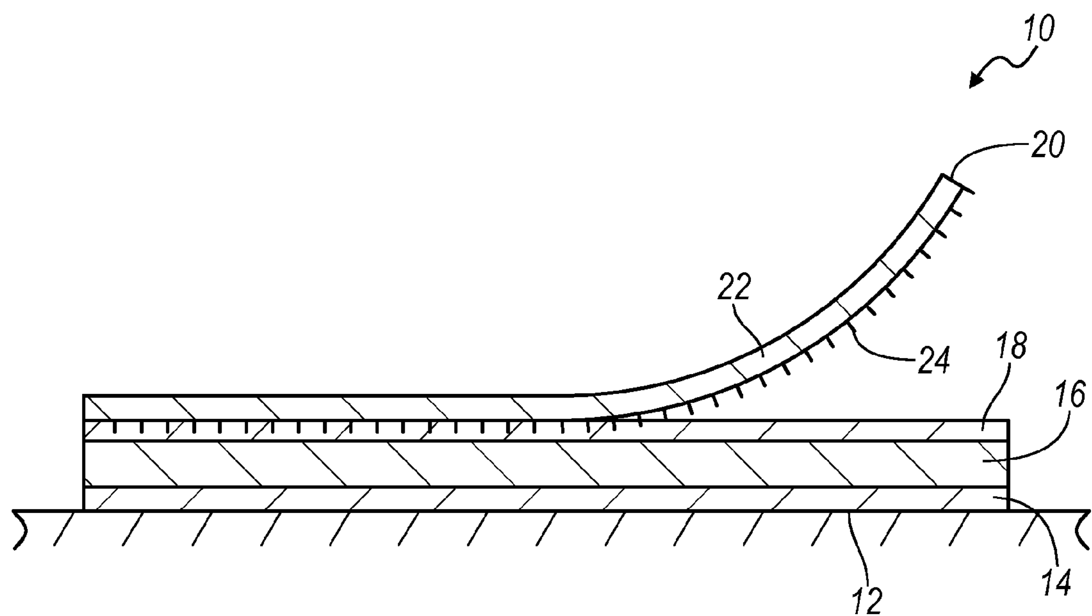
10
20
22
24
18
16
14
12

TWO-PART FOAMABLE ADHESIVE WITH RENEWABLE CONTENT FOR FLEECE BACK MEMBRANES

CROSS-REFERENCE TO RELATED APPLICATIONS

This application claims priority to International Application No. PCT/US2011/040161, which claims the benefit of U.S. Provisional Application No. 61/368,957, filed on Jul. 29, 2010. The disclosure of the above application is incorporated herein by reference.

FIELD

The present invention relates to a two-part foamable adhesive for use on roofing substrates, and more particularly to a two-part foamable adhesive having renewable content for use with fleece back membranes on roofing substrates.

BACKGROUND

In many roofing applications, for example in large, flat commercial roof decks, a roofing membrane is used to seal and protect the roof deck from environmental weather conditions. The roofing membrane may be made of various materials, such as polymeric materials including EPDM (ethylene propylene diene M-rubber) or TPO (thermoplastic polyolefin). The roofing membrane is adhered overtop insulation boards or cover-boards. The insulation boards are typically secured to the roofing substrate or roof deck via an adhesive composition or mechanically fastened. Conventional adhesives used to adhere the roofing membrane to the insulations boards include mopping asphalt (typically Type III or Type IV), polychloroprene based adhesives, and polyurethane. The polyurethane adhesives are oftentimes applied directly onto the roof deck and the insulation boards are then laid onto the roof deck surface. Conventional polyurethane adhesives oftentimes include two separate parts that are mixed by an applicator just prior to being applied onto the surface of the roof deck. The two parts include an isocyanate blend and a polyol blend. Upon mixing, the isocyanate blend reacts or crosslinks with the polyol blend to form the polyurethane adhesive.

These foamed polyurethane adhesives, while effective for most substrates, have had some issues when used with fleece backed membranes, as described in U.S. Pat. No. 4,996,812, U.S. Pat. No. 6,938,386, and U.S. Pat. No. 6,742,313. Accordingly, there is room in the art for an adhesive composition in roofing applications that exhibits favorable properties, such as sufficient adhesive strength, shelf life, cure time, that also includes a renewable or environmentally favorable content that can be used with fleece backed membranes.

SUMMARY

The present invention provides an adhesive composition for use on a roofing substrate to adhere a fleece backed membrane to the roofing substrate. The adhesive composition includes two components that are mixed prior to application on the roofing substrate. The first component includes a renewable polyol, catalysts, rheology modifier, and surfactants. The renewable polyol is selected from any non-petroleum based polyol that is derived from a renewable source. The second component includes an isocyanate. The isocyanate may be a renewable isocyanate or a non-renewable isocyanate. The second component may also include a polyol and rheology modifier.

In one aspect of the present invention, the renewable polyol is a soybean oil based polyol.

In another aspect of the present invention, the renewable polyol is based upon the hydroxylation of a fatty acid based triglyceride.

In another aspect of the present invention, the renewable polyol is a Castor oil or Glycerine based polyol.

Further areas of applicability will become apparent from the description provided herein. It should be understood that the description and specific examples are intended for purposes of illustration only and are not intended to limit the scope of the present disclosure.

DRAWING DESCRIPTION

The drawing illustrates an exemplary assembly of a fleece backed membrane applied to a substrate with an adhesive according to the principles of the present invention.

DETAILED DESCRIPTION

The following description is merely exemplary in nature and is not intended to limit the present disclosure, application, or uses.

With reference to the drawing, an exemplary assembly using a two-part adhesive composition according to the principles of the present invention is generally indicated by reference number 10. The assembly includes a substrate 12, a first adhesive layer 14, an insulation board or cover board 16, a second adhesive layer 18, and a fleece backed membrane 20. The substrate 12 may take various forms including, for example, a concrete, light weight concrete, wood, gypsum, wood fiber or steel roof deck. The first adhesive layer 14 is applied to the substrate 12. The first adhesive layer 14 adheres the insulation board 16 to the substrate 12. Various adhesives may be used, including, for example, a two-part foamed polyurethane adhesive. The first adhesive layer 14 may be applied in sheets, beads or as strips overtop the substrate 12. The insulation board 16 may then be pressed onto the substrate 12. It should be appreciated that the insulation board 16 may take various forms, such as rolled sheets, and be made of various materials without departing from the scope of the present invention. The second adhesive layer 18 is applied overtop the insulation board or cover board layer 16. The second adhesive layer 18 is a two-part adhesive composition generally formed by combining the two separate compositions or blends prior to application on the roofing substrate. The two parts include a "B Side" or resin side and an "A Side" or isocyanate containing side. Each of the sides are packaged separately and are mixed by an applicator prior to applying on the roofing substrate, as will be described in greater detail below. Once the second adhesive layer 18 has been applied to the insulation board or cover board layer 16, the fleece backed membrane 20 is rolled or otherwise applied overtop the adhesive layer 18. The fleece backed membrane 20 includes an upper layer 22 and a fleece-like layer 24. The upper layer 20 is preferably a rubber like layer made from, for example, EPDM or TPO. The fleece-like layer 24 is secured to an underside of the upper layer 20. The fleece-like layer 24 is preferably a non-woven polyester fleece-like layer, though other fleece-like or fibrous materials may be used. Examples include Carlisle's FleeceBACK® EPDM and FleeceBACK® TPO. The fleece-like layer 24 at least partially penetrates the second adhesive layer 18, thereby providing a secure adhesive and mechanical bond between the second adhesive layer 18 and the fleece backed membrane 20.

As noted above, the second adhesive layer 18 is a two-part adhesive composition formed by combining a "B Side" or resin side and an "A Side" or isocyanate containing side prior to application on the roofing substrate 12 or insulation board 16. The second adhesive layer 18 is adapted to be used with the fleece-backed membrane 20. Additionally, due to the finite nature of petrochemical resources, increasing emphasis is now placed on the development of polymers from renewable resources abundantly available in nature. In particular, agricultural processing by products such as soy proteins from oil processing are of increasing significance since these are eco-friendly materials based on renewable natural resources. The two-part adhesive composition of the present invention is typically foaming, with a low to high level of renewable carbon content, providing for increased environmentally friendly adhesive solutions. Varying degrees of renewable carbon content may be present in either the "A side" or isocyanate/prepolymer side, the "B side" or resin side, or both the "A side" (prepolymer side) and "B side" resin side, depending on the amount of renewable content desired.

The B Side blend generally includes a renewable polyol and one or more catalysts and may optionally included rheology modifiers such as fumed silica, and may include a surfactant. The renewable polyol is selected from any non-petroleum based polyol that is derived from a renewable source, i.e., is a natural polyol. In a preferred example of the present invention, the renewable polyol is a soybean oil based polyol. Alternatively, the renewable polyol includes Castor oil based polyols and polyols based upon the hydroxylization of a fatty acid based triglyceride. Exemplary renewable polyols suitable with the composition of the present invention are commercially available from Urethane Soy Systems Company under the designation SOYOL including SOYOL R2-052-G and R2-052-C. Other exemplary renewable polyols commercially available from the G. R. O'Shea Company under the designation POLYCIN. Further examples are available under the designation Agrol 2.0 and Agrol 3.6 from BioBased Technologies, LLC and BiOH 210 and 600 from Cargill. Chemical derivatives and combinations of renewable polyols may also be employed in the composition without departing from the scope of the present invention. The renewable polyol comprises from about 10% to about 95% by weight of the B Side of the composition. In addition, the B side composition may include a nonrenewable polyol in addition to the renewable polyol. An exemplary nonrenewable polyol is ARCOL PPG 2000 commercially available from Bayer MaterialScience, or any other compound conventionally used in the production of polyurethanes and having at least one isocyanate-reactive functionality. Another exemplary polyol suitable with the composition of the present invention includes polypropylene glycol commercially available from BASF under the designation PLURACOL P2010. The non-renewable polyol comprises from about 1% to about 80% by weight of the B Side of the composition when present.

The catalysts are selected from any water stable catalysts in order to achieve the desired reaction profile between the resin and isocyanate components. In a preferred example of the present invention, the catalysts used in the B Side blend include a catalyst commercially available from Air Products and Chemicals under the designation DABCO 33LV, and Dimethylethanolamine (DMEA) commercially available from numerous manufacturers. While DABCO 33 LV and DMEA are used in this example, it should be clear to anyone skilled in the art that numerous other amines and their derivatives could be used in this application. In addition, chemical derivatives and combinations of catalysts may also be employed in the composition without departing from the scope of the present invention. The Dabco 33LV catalyst comprises from about 0% to about 5% by weight of the B-Side of the composition and the DMEA comprises from about 0% to about 3% by weight of the B Side of the composition.

The fumed silica is used as a thickening agent and it should be appreciated that other rheology modifiers may be selected other than fumed silica without departing from the scope of the present invention. Fumed silica suitable for use with the present invention is commercially available from Cabot under the name CAB-O-SIL TS-720 or commercially available from Wacker Chemie AG under the name HDK H18. Chemical derivatives and combinations of rheology modifiers may also be employed in the composition without departing from the scope of the present invention. The fumed silica comprises from about 0.5% to about 3.0% by weight of the B Side of the composition when present.

The surfactant or compatabilizer is preferably a 30 mole ethylene oxide adduct of sodium lauryl sulfate. However, less than or more than 30 moles of ethylene oxide may be employed. Exemplary surfactants suitable with the composition of the present invention are commercially available from Cognis under the designation DISPONIL FES-77 IS and from the Stepan Company under the designation Polystep B-19. Chemical derivatives and combinations of surfactants or compatabilizers may also be employed in the composition without departing from the scope of the present invention. The surfactant or compatabilizer comprises from about 0.1% to about 4% by weight of the B Side of the composition when present.

Other components may be added to the composition, such as water and adhesion promoters. Water may be present in the composition in an amount from about 1% to about 10% by weight of the B side of the composition. An exemplary adhesion promoter includes B515.71 WM from Chartwell International, Inc. The adhesion promoter comprises from about 0.5% to about 5% by weight of the B side of the composition when present. Another adhesion promoter suitable for use with the present composition includes AP Silane 33 commercially available from Advanced Polymer, Inc., which comprises from about 0.5% to about 3% by weight of the B side or A side of the composition when present.

The blend of renewable polyol, catalysts, fumed silica and surfactants are made shelf stable by the incorporation of the catalyst blend that includes the SLES and amines. Shelf stability means that the blend reacts the same or very nearly the same as when it was initially blended even after 6 months storage.

The A Side component includes a renewable isocyanate, and may include non-renewable isocyanates, polyols, adhesion promoters, and rheology modifiers. The A side may also include other components such as surfactants and catalysts without departing from the scope of the present invention. The isocyanate includes compounds having at least one isocyanate functionality group of NCO. One exemplary isocyanate suitable with the composition of the present invention includes a biomass sourced difurfuryl diisocyanate, or other renewable diisocyanate. An exemplary renewable diisocyanate is DDI 1410® available from Cognis Corporation. A formula with over 99% renewable content can now be formed by combining the A side, containing the renewable isocyanate with the B side, composed almost entirely of a renewable polyol. Other suitable isocyanates may include non-renewable isocyantes commercially available from BASF under the designation LUPRANATE M10. Another exemplary isocyanate suitable with the present invention includes polymeric diphenylmethane diisocyanate commercially available from Bayer MaterialScience under the designation MONDUR MRS-5 and MONDUR MR. Chemical derivatives and combinations of isocyanates may also be employed in the composition without departing from the scope of the present invention. The isocyanate comprises from about 50% to about 100% by weight of the A Side of the composition.

The polyol includes any compound conventionally used in the production of polyurethanes and having at least one isocyanate-reactive functionality. One exemplary polyol suitable with the composition of the present invention includes polypropylene glycol commercially available from BASF under the designation PLURACOL P2010. Another exemplary polypropylene glycol suitable with the present invention is commercially available from Bayer MaterialScience under the designation ARCOL PPG-2000. Chemical derivatives and combinations of polyol may also be employed in the composition without departing from the scope of the present invention. The polyol comprises from about 15% to about 30% by weight of the A Side of the composition when present.

The fumed silica is used to aid in the dispensing of the A side composition from the applicator. It should be appreciated that other rheology modifiers may be selected other than fumed silica without departing from the scope of the present invention. Fumed silica suitable for use with the present invention is commercially available from Cabot under the name CAB-O-SIL TS-720 or commercially available from Wacker Chemie AG under the name HDK H18. Chemical derivatives and combinations of rheology modifiers may also be employed in the composition without departing from the scope of the present invention. The fumed silica comprises from about 0.5% to about 4% by weight of the A Side of the composition when present.

A surfactant may also be included in the present composition. An exemplary surfactant suitable with the present composition includes a silicone surfactant commercially available from Air Products under the designation DABCO DC193. The surfactant may be present in an amount from about 0.5% to about 3.0% by weight of the A side of the composition.

A catalyst may also be included in the present composition. An exemplary catalyst suitable with the present composition includes an organotin carboxylate catalyst, for example dibutyltin diacetate commercially available from Vertellus under the designation COTIN 227. The catalyst may be present in an amount from about 0.05% to about 0.250% by weight of the A side of the composition.

In order that the invention may be more readily understood, reference is made to the following examples which are intended to illustrate various embodiments of the two-part adhesive composition of the present invention, but not limit the scope thereof:

Example 1

| Material | Parts by Weight (pbw) |
|---|---|
| B side | |
| R2-052-G | 91.473 |
| Dabco 33 LV | 2.752 |
| DMEA | 0.917 |
| TS720 | 1.835 |
| Disponil Fes 77 is | 2.752 |
| A side | |
| DDI 1410 | 100 |

Example 2

| Material | Parts by Weight (pbw) |
|---|---|
| B side | |
| R2-052-G | 57.554 |
| DB Oil | 38.369 |
| Dabco 33 LV | 0.959 |
| DMEA | 0.384 |
| Disponil Fes 77 is | 2.734 |
| A side | |
| DDI 1410 | 100 |

Example 3

| Material | Parts by Weight (pbw) |
|---|---|
| B side | |
| R2-052-C | 18.425 |
| Pluracol P2010 | 73.699 |
| Dabco 33 LV | 2.533 |
| B515.71 WM | 1.198 |
| Water | 2.303 |
| TS720 | 1.842 |
| A side | |
| Lupranate M20S | 77 |
| Pluracol P2010 | 21 |
| TS720 | 2 |

Example 4

| Material | Parts by Weight (pbw) |
|---|---|
| B side | |
| R2-052-G | 60.0-100.0 |
| Dabco 33 LV | 0.20-2.00 |
| Dabco DMEA | 1.0-3.0 |
| Disponil Fes 77 is | 1.0-5.0 |
| HDK H18 | 0.50-3.0 |
| A side | |
| Lupranate M10 | 50.0-80.0 |
| PPG 2000 | 20.0-50.0 |
| Dabco DC193 | 0.50-3.0 |
| HDK H18 | 0.50-3.0 |
| Cotin 227 | 0.05-0.25 |

It should be appreciated that the exemplary trade name materials referenced are for illustration purposes only, and that suitable equivalent manufacturers may be employed. In addition, the A Side and B Side components may include other additives without departing from the scope of the present invention.

The A and B side components may be packaged in several ways. For example, each may be stored in a collapsible bag disposed within a box (known as Bag in the Box), stored in rigid containers such as drums or barrels, paired in cylinders, or in flexible, fully compressible structures such as collapsible tubes that dispense the materials.

As noted above, the A Side and B Side components are preferably mixed by an applicator prior to being extruded, pumped or otherwise applied to the roofing substrate. For example, the polyurethane adhesive composition is applied as discrete beads. Space is left between adhesion points in order to allow for gas flow, thereby preventing bumps and distortions of the roof substrate. Forms of application include using a cartridge, using low pressure pumping of the two components and mixing them with a static mixer, or using high pressure tanks that are brought to about 500-1500 psi within an inert dry gas, such as Nitrogen. In the latter form of application, the A and B side materials are metered as two individual components and brought together and mixed by high pressure impingement or by a static mixer and then applied in a bead form. In addition, a multi bead applicator system in which individual components are brought together under ambient conditions and are mixed generally through a static mixer may be employed. The multi bead applicator system may include individual two-component cylinders or the two components may be brought together under various pumping methodologies and mixed through a static mixer. The "A" and "B" side components are generally mixed in a ratio of 1:1 by volume, however the ratio may range from about 10:1 to about 1:10. During mixing, and after mixing, the A Side components and B Side components react to form a polyurethane adhesive composition having suitable physical properties.

In a preferred embodiment, each of the A side and B side contain a dye of two separate colors which, upon mixing, creates a new color indicative of proper blending of the A and B sides. For example, the A side may contain a red dye and the B side may contain a white dye and upon mixing the composition has a pink color. It should be appreciated that other colors may be employed without departing from the scope of the present invention. The composition may be applied to substrates in environmental temperatures ranging from approximately −40 degrees Fahrenheit to approximately 200 degrees Fahrenheit.

In addition, the composition exhibits the following aged peel strength tested according to ASTM Peel Test D903, shown for various fleece backed substrates in Tables 1-6:

TABLE 1

| Present Composition - 24 Hour Cure | | |
|---|---|---|
| Carlisle | Test No. 1 | 14.97 pli |
| Fleece- | Test No. 2 | 18.28 pli |
| Back | Test No. 3 | 16.07 pli |
| EPDM | Test No. 4 | 15.45 pli |
| | Test No. 5 | 16.60 pli |

Average = 16.28 pli

TABLE 2

| Present Composition - 7 Day Cure | | |
|---|---|---|
| Carlisle | Test No. 1 | 18.71 pli |
| Fleece- | Test No. 2 | 17.39 pli |
| Back | Test No. 3 | 11.71 pli |
| EPDM | Test No. 4 | 13.37 pli |
| | Test No. 5 | 15.60 pli |

Average = 15.35 pli

TABLE 3

| Present Composition - 24 Hour Cure | | |
|---|---|---|
| Firestone | Test No. 1 | 30.11 pli |
| Fleece- | Test No. 2 | 31.01 pli |
| Back TPO | Test No. 3 | 21.76 pli |
| | Test No. 4 | 22.52 pli |
| | Test No. 5 | 18.67 pli |

Average = 24.81 pli

TABLE 4

| Present Composition - 7 Day Cure | | |
|---|---|---|
| Firestone | Test No. 1 | 30.34 pli |
| Fleece- | Test No. 2 | 29.28 pli |
| Back TPO | Test No. 3 | 23.59 pli |
| | Test No. 4 | 28.71 pli |
| | Test No. 5 | 23.40 pli |

Average = 27.06 pli

TABLE 5

| Present Composition - 24 Hour Cure | | |
|---|---|---|
| Sarnafill | Test No. 1 | 19.24 pli |
| Fleece | Test No. 2 | 18.28 pli |
| Back PVC | | |

Average = 19.05 pli

TABLE 6

| Present Composition - 7 Day Cure | | |
|---|---|---|
| Sarnafill | Test No. 1 | 16.92 pli |
| Fleece | Test No. 2 | 16.43 pli |
| Back PVC | | |

Average = 16.57 pli

The description of the invention is merely exemplary in nature and variations that do not depart from the gist of the invention are intended to be within the scope of the invention. Such variations are not to be regarded as a departure from the spirit and scope of the invention.

The following is claimed:

1. A composite roof structure supported by a roof substrate, the composite roof structure comprising:

a two-part adhesive material secured to the roof substrate; and a flexible membrane including a sheet of flexible material having fleece-like matting secured to the underside thereof, wherein the flexible membrane is attached to the adhesive material with at least a portion of the matting imbedded within the adhesive material, and the said two-part adhesive material is a polyurethane adhesive consisting essentially of:

a first polyol part having
- a renewable polyol,
- a catalyst,
- a surfactant,
- a rheology modifier; and combined with a second isocyanate part having:
- an isocyanate,
- a polyol,
- a surfactant,
- a rheology modifier, and
- a catalyst, and the polyurethane adhesive exhibits a peel strength from about 15 pli to about 25 pli at 24 hours of cure time.

2. The composite roof structure of claim 1 wherein the flexible membrane is at least one of a thermoplastic olefin rubber and an ethylene propylene diene monomer rubber.

3. The composite roof structure of claim 1 wherein the adhesive material is secured to the roof substrate in discrete lines or beads.

4. The composite roof structure of claim 1 wherein the flexible membrane is adhered over top of insulation boards or cover boards and wherein the boards are secured to the substrate via the adhesive material.

5. The composite roof structure of claim 1 wherein the renewable polyol is present in an amount from about 60% to about 97.3% by weight of the first part, the catalyst is present in an amount from about 0.20% to about 5% by weight of the first part, the surfactant is present in an amount from about 1.0% to about 5.0% by weight of the first part, the rheology modifier is present in an amount from about 0.5% to about 3% by weight of the first part, the isocyanate is present in an amount from about 50% to about 80% by weight of the second part, the polyol is present in an amount from about 20% to about 50% by weight of the second part, the surfactant is present in an amount from about 0.5% to about 3% by weight of the second part, the rheology modifier is present in an amount from about 0.5% to about 3% by weight of the second part, and the catalyst is present in an amount from about 0.05% to about 0.25% by weight of the second part.

6. The composite roof structure of claim 5 wherein the catalyst of the first part includes a first catalyst present in an amount from about 1.0% to about 3.0% by weight of the first part and a second catalyst present in an amount from about 0.2% to about 2.0% by weight of the first part.

* * * * *